(12) United States Patent
Lehmann et al.

(10) Patent No.: US 11,463,287 B2
(45) Date of Patent: Oct. 4, 2022

(54) METHOD AND DEVICES FOR DETERMINING THE MODULATION TYPE OF A SIGNAL, AND CONFIGURATION OF AN AMPLIFICATION UNIT

(71) Applicant: MOLEX CVS DABENDORF GMBH, Zossen (DE)

(72) Inventors: Lars Lehmann, Wildau (DE); Helmut Kautge, Stahnsdorf (DE); Marcus Weigelt, Zossen (DE)

(73) Assignee: MOLEX CVS DABENDORF GMBH, Zossen (DE)

( * ) Notice: Subject to any disclaimer, the term of this patent is extended or adjusted under 35 U.S.C. 154(b) by 255 days.

(21) Appl. No.: 16/761,812

(22) PCT Filed: Nov. 6, 2018

(86) PCT No.: PCT/EP2018/080309
§ 371 (c)(1),
(2) Date: Dec. 8, 2020

(87) PCT Pub. No.: WO2019/086704
PCT Pub. Date: May 9, 2019

(65) Prior Publication Data
US 2021/0091982 A1    Mar. 25, 2021

(30) Foreign Application Priority Data

Nov. 6, 2017   (DE) .......................... 102017219691.2

(51) Int. Cl.
*H04L 27/00* (2006.01)
*H04B 17/327* (2015.01)
*H04B 1/10* (2006.01)

(52) U.S. Cl.
CPC ....... *H04L 27/0012* (2013.01); *H04B 1/1027* (2013.01); *H04B 17/327* (2015.01); *H04L 27/0008* (2013.01)

(58) Field of Classification Search
CPC ............ H04L 27/0012; H04L 27/0008; H04B 1/1027; H04B 17/327; H04B 1/0475
See application file for complete search history.

(56) References Cited

U.S. PATENT DOCUMENTS

| 5,802,114 A | * | 9/1998 | Koszarsky | ........... H04B 17/318 455/142 |
| 6,397,077 B1 | * | 5/2002 | Jensen | ................... H04B 1/005 455/571 |

(Continued)

FOREIGN PATENT DOCUMENTS

| EP | 1841083 A2 | 10/2007 |
| EP | 2755329 A2 | 7/2014 |

(Continued)

OTHER PUBLICATIONS

International search report received for PCT application No. PCT/EP2018/080309, dated Jan. 7, 2019, 14 pages.

(Continued)

*Primary Examiner* — Vineeta S Panwalkar (57) ABSTRACT

Disclosed are methods and devices for determining a modulation type of a signal using a circuit arrangement. The power is detected for a signal received at the circuit arrangement. This is done by means of N measured values in a measurement window. Based upon the detected power and one or more reference values or reference patterns, e.g., by means of a comparison or a correlation, the modulation type of the signal can be determined from a plurality of modulation types. Disclosed are also methods and devices for configuring an amplification unit of a circuit arrangement, in which the power of a received signal is detected by means (Continued)

of N measured values in a measurement window, and the amplification unit is configured based upon the detected power and one or more reference values or reference patterns.

20 Claims, 6 Drawing Sheets (56) References Cited

U.S. PATENT DOCUMENTS

| | | |
|---|---|---|
| 7,421,261 B2 | 9/2008 | Sahlin et al. |
| 2004/0204878 A1 | 10/2004 | Anderson et al. |
| 2005/0258904 A1* | 11/2005 | Mehr ............... H03F 3/189 330/305 |
| 2007/0258548 A1* | 11/2007 | Sutton ............. H03G 3/3052 375/345 |
| 2012/0071154 A1 | 3/2012 | Thompson |
| 2012/0088510 A1* | 4/2012 | Akhi ............... H03F 1/0261 455/450 |
| 2015/0350001 A1 | 12/2015 | Zhu et al. |
| 2017/0195126 A1 | 7/2017 | Brooks et al. |

FOREIGN PATENT DOCUMENTS

| | | |
|---|---|---|
| WO | 01/03397 A1 | 1/2001 |
| WO | 2009/155134 A2 | 12/2009 |
| WO | 2019/086704 A1 | 5/2019 |

OTHER PUBLICATIONS

Dobre et al., "Survey of automatic modulation classification techniques: classical approaches and new trends", IET Communications, vol. 1, Issue 2, pp. 137-156, 2007.

* cited by examiner

METHOD AND DEVICES FOR DETERMINING THE MODULATION TYPE OF A SIGNAL, AND CONFIGURATION OF AN AMPLIFICATION UNIT

RELATED CASES

This application is a National Phase of International Application No. PCT/EP2018/080309, filed on Nov. 6, 2018, which claims the benefit of Germany Application No. 10 2017 219 691.2, filed Nov. 6, 2017, each of which are incorporated herein by reference in their entirety.

FIELD OF INVENTION

The invention relates to a method for setting an amplifier system as a function of the modulation type used and for determining a modulation type of a signal. The invention also relates to a circuit arrangement for carrying out such methods.

BACKGROUND ART

In cases in which a signal is to be processed further by a circuit arrangement, it may be necessary for the further processing that the modulation type of the signal be known. As a rule, the circuit arrangement which is to further process the signal has information regarding the modulation type by means of which the signal to be processed has been modulated. In some cases, however, the circuit arrangement has no or only insufficient information about the modulation type of the signal. In this case, the circuit arrangement cannot take into account modulation-type-specific parameters or properties during the further processing of the signal. This can lead to processing of the signal that is not according to the specification, which can hinder signal demodulation and/or lead to unauthorized interference transmissions.

Circuit arrangements that have no or only insufficient information about the modulation type, but require it for optimal further processing may, for example, be circuit arrangements designed to amplify signals between an end device and an antenna.

Such circuit arrangements are used, for example, in motor vehicles in order to amplify a signal of a mobile telephone located in the interior of the motor vehicle towards an external motor vehicle antenna and to thus improve the reception of the mobile telephone. In such an exemplary scenario, the mobile telephone can be connected to an external antenna of the motor vehicle by means of the circuit arrangement and a high-frequency line. As a rule, the amplification of the circuit arrangement is used to compensate for the attenuation of the signal transmission between the mobile telephone and the external antenna of the motor vehicle.

These circuit arrangements support various communications standards of modern mobile telephones, such as Global System for Mobile Communications (GSM), Universal Mobile Telecommunications System (UMTS), Long Term Evolution (LTE), etc., using different transmission methods and different frequency ranges, as well as standards for local wireless networks.

Such known circuit arrangements configure their amplification unit, which may have one or more amplifiers, as a function of a detected frequency range and/or of a temporal signal sequence. However, in configuring the amplification unit, it must be ensured that the amplified signals continue to comply with the specifications of a communications standard used. Such specifications relate, for example, to linearity parameters or maximum permissible output powers of the mobile radio signal, which, in the same communications standard, can differ as a function of the modulation used.

An example of a communications standard that has specific, maximum output powers and linearity parameters for the supported modulation types is the GSM/EDGE standard (EDGE=Enhanced Data rates for GSM Evolution), which supports the modulations, "Gaussian Minimum Shift Keying" (GMSK) and "8-Phase-Shift Keying" (8-PSK).

The corresponding limit values for the different modulation types are specified in, for example, ETSI TS 151 010-1 v.12.5.0.

A further example is the communications standard, LTE (Long Term Evolution), which, depending upon the currently specified transmission signal modulation (QPSK, 16QAM, 64QAM, 265QAM), specifies very different requirements for the linearity of the signal processing system. Examples include the modulation-dependent EVM linearity requirements (EVM=Error Vector Magnitude) listed in ETSI TS 136 101 V14.3.0.

In order to be able to support as many communications standards and/or modulation types as possible with the known amplification systems, the specified maximum output powers and the linearity parameters must always be complied with, which means that the amplifier unit in the circuit arrangements of the type mentioned above must always be set for the highest required linearity and the minimum permissible output power.

However, this has the consequence that, on the one hand, the maximum output power cannot be utilized for all modulation types and, on the other, the efficiency of the amplifier system is reduced.

Accordingly, the invention is based upon the aim of providing a circuit arrangement and a corresponding method which eliminate the aforementioned disadvantages. A circuit arrangement and a corresponding method for determining the modulation type of a signal are thus to be provided without it being necessary to demodulate the signal. In particular, a circuit arrangement and a corresponding method for setting the amplifier unit of the circuit arrangement as a function of the modulation type of a signal are to be provided without it being necessary to demodulate the signal.

SUMMARY

The aim is achieved by the method and the circuit of the independent claims. Advantageous embodiments are claimed in the dependent claims.

The method according to the invention for determining a modulation type of a signal by means of a circuit arrangement comprises receiving a signal at the circuit arrangement, detecting a power of the signal with N measured values in a measurement window, and determining a modulation type of the signal from a plurality of modulation types based upon the detected power and one or more reference values or reference patterns.

This method according to the invention thus enables simple determination of a modulation type of a received signal on the basis of its power. In particular, the detected power-time behavior of the signal, or the detected power, at different points in time in close succession is used for this purpose. This may be of considerable importance for efficient subsequent processing of the signal. For example, modulation-type-specific parameters can thus be taken into account in the subsequent processing.

The method according to the invention for configuring an amplification unit of a circuit arrangement having one or more amplifiers arranged in parallel signal branches comprises receiving a signal at the circuit arrangement, detecting a power of the signal with N measured values in a measurement window, and configuring the amplification unit based upon the detected power and one or more reference values or reference patterns.

This method according to the invention thus enables an efficient setting of the amplifier unit of a circuit arrangement of the type mentioned at the outset, wherein, in particular, the detected power-time behavior of the signal, or the detected power, at different points in time in close succession can be used for determining the configuration. The circuit arrangement can thus support modulation-type-specific maximum output powers and linearity parameters, as well as the different requirements specified—for example, by the LTE standard—for the linearity of the signal processing system. Overdriving of the amplifier output stage can thus also be avoided, and it can be ensured that the amplifier operates in the linear range.

The circuit arrangement according to the invention for determining a modulation type of a signal comprises a transmission unit configured to receive a signal, a power detector, and a control unit configured to detect a power of the signal with N measured values in a measurement window, in order to determine a modulation type of the signal from a plurality of modulation types based upon the detected power and one or more reference values or reference patterns.

The circuit arrangement according to the invention for configuring an amplification unit of the circuit arrangement having one or more amplifiers arranged in parallel signal branches comprises a transmission unit configured to receive a signal, a power detector configured to detect a power of the signal with N measured values in a measurement window, and a control unit set up to configure the amplification unit based upon the detected power and one or more reference values or reference patterns.

In each of the aforementioned embodiments according to the invention, the signal is received via a radio interface. For this purpose, the circuit arrangement can have a signal coupling device, i.e., a transmission unit, which accepts wireless radio transmission signals and couples them into a high-frequency line for further processing and/or decouples received signals for wireless transmission. Dispensing with a wired connection between a transmitting device that sends the signal and the circuit arrangement allows support of a plurality of end devices without a uniform cable interface, as well as greater spatial flexibility and additional comfort.

Alternatively, a transmitting device can also be connected to the circuit arrangement via a cable, which avoids interferences which occur in the case of a radio connection.

Preferably, the N measured values are successively sampled values of the signal. For a reliable determination of the modulation type, it is necessary for the N measured values to be successively sampled values of the signal. Accordingly, for example, it is not possible to take into account, for the determination of the modulation type, previously detected measured values belonging to another signal.

Preferably, the power of the signal is detected with N measured values in a measurement window by sampling the signal in the measurement window.

The number of N measured values must be adapted to the modulation type to be detected. For example, the number N of measured values can be more than 10 measured values—preferably, more than 20 measured values. The number N of measured values can also include less than 100 measured values—preferably, less than 50 measured values. In a preferred embodiment, the number N may correspond to 32 measured values.

The duration of the measurement window must also be adapted to the modulation type to be detected. Preferably, the measurement window is longer than the duration of a modulated symbol of the signal. This may be necessary in order to be able to determine the modulation type reliably.

An exemplary duration of a measurement window may be more than 50 µs—preferably, more than 90 µs. Furthermore, the duration may, for example, be less than 200 µs—preferably, less than 110 µs. In a preferred embodiment, the measurement window may have a duration of 100 µs.

In particular, the determination of the modulation type or the configuration of the amplifier unit comprises comparing an amplitude time curve of the signal with a reference pattern. Thus, the modulation type to be detected can be recognized quickly and reliably, or the amplifier unit can be configured accordingly.

In an alternative embodiment, comparison with the reference pattern can be omitted. In this embodiment, determining the modulation type or configuring the amplifier unit may include determining a first power value and a second power value, wherein the first and the second power value is each a different one from a maximum power value Nmax, a minimum power value Nmin, and an average power value of the N measured values, and calculating a comparison parameter from the first and the second power value, and comparing the comparison parameter with one or more threshold values. It has been found that this method can be implemented very easily in terms of circuit technology and leads to reliable results.

The comparison parameter from the first and the second power value preferably comprises a difference or a quotient of the first and the second power value.

It is furthermore preferred that the average power value of the N measured values be the effective power of the signal.

The comparison with the one or more threshold values also preferably comprises a comparison with a lower threshold value and with an upper threshold value. It is thus possible to determine whether the calculated difference lies within a threshold value range spanned by the lower threshold value and in the upper threshold value.

Preferably, each of the plurality of modulation types has a predetermined lower threshold value and a predetermined upper threshold value. The modulation type of the signal can then be determined by the comparison parameter being greater than or equal to the predetermined lower threshold value and less than or equal to the predetermined upper threshold value of the modulation type. The comparison parameter can be compared successively with the threshold values of the different modulation types. If the comparison parameter falls within the threshold value range, spanned by the lower threshold value and the upper threshold value, of a specific modulation type, it can be determined that the signal is present in this modulation type, or the amplification unit can be configured accordingly. When comparing the calculated difference with the threshold value range, the respective threshold value limits can be included in or excluded from the threshold value range.

In the case where only two different modulation types are to be distinguished, a single threshold value may suffice for the determination. The modulation type is accordingly determined, or the amplification unit is configured, by selecting the first modulation type if the comparison parameter is above or, where applicable, below the threshold value, and otherwise selecting the second modulation type.

Preferably, the plurality of modulation types comprises modulation types that include frequency modulation and amplitude modulation. In particular, the plurality of modulation types may include Gaussian Minimum Shift Keying (GMSK), 8-Phase-Shift Keying (8-PSK), 16-Quadrature Amplitude Modulation (16-QAM), or 32-Quadrature Amplitude Modulation (32-QAM).

By the method according to the invention, frequency-modulated signals can, preferably, be reliably distinguished from amplitude-modulated and/or phase-modulated signals by means of threshold value comparison.

In one embodiment, the plurality of modulation types includes GMSK and 8-PSK, and the predetermined lower threshold value and the predetermined upper threshold value of 8-PSK are respectively greater than the predetermined lower threshold value and the predetermined upper threshold value of GMSK. For example, when using 8-PSK and GMSK for modulation in the GSM/EDGE mobile radio standard, the lower threshold value of GMSK may be 0 dB and the upper threshold value of GMSK may be 0.1 dB, wherein the lower threshold value of 8-PSK may be 2 dB and the upper threshold value of 8-PSK may be 4 dB, for example.

If only GMSK is to be distinguished from 8-PSK, a single threshold value can be used. If the comparison parameter is above the threshold value, it is 8-PSK; otherwise, it is GMSK. An exemplary threshold value in this case could be between 0.5 and 1 dB.

It should be noted here that the aforementioned threshold values in the unit dB may also be dependent upon the power detector used and/or circuit components used.

In each of the aforementioned embodiments, it may be preferred to furthermore determine the frequency range and/or the time curve of the signal and to determine the plurality of modulation types based upon the determined frequency range and/or time curve of the signal. Thus, preferably in advance and/or in parallel, the number of modulation types to be distinguished can be limited, e.g., if it can be recognized by means of the frequency range that only a specific communications standard is present, which, for example, permits only two different modulation types.

Preferably, the measurement window is shorter than or equal to the duration of one transmission time slot if the signal is transmitted using a time-slot-based transmission type. Reliable determination of the modulation type is only possible if the measurement window does not exceed a transmission time slot, since this would falsify the calculated difference. Examples of a time-slot-based transmission type are GSM and LTE-TDD (TDD=Time Division Duplex).

The point in time of the start of the measurement window should also preferably be determined according to the modulation type and/or transmission type. For example, in a time-slot-based transmission type, an arrangement of the measurement window in the middle of the transmission time slot is advantageous—in particular, if the transmission time slot has a midamble or training sequence.

The circuit arrangement preferably comprises an amplification unit which has one or more amplifiers arranged in parallel signal branches. The method according to the invention preferably furthermore comprises amplifying the signal between an end device and an antenna.

The amplification unit can be configured in different ways. Preferably, configuring the amplification unit comprises configuring the one or more amplifiers and/or configuring the signal routing in the amplification unit and/or configuring an attenuation device.

In configuring the one or more amplifiers, settings of the one or more amplifiers themselves are adjusted.

The alternative or supplemental configuration of the signal routing enables a configuration of the amplification unit by activating and/or deactivating different signal branches having differently designed amplifier devices. Thus, for example, a first signal branch may have an amplifier for a first maximum output power of a first modulation type, and a second signal branch may have an amplifier for a second maximum output power of a second modulation type. The amplification unit can then be configured in such a way that the first signal branch is switched in the case of a signal of a first modulation type, and the second signal branch is switched in the case of a signal of a second modulation type.

Alternatively or additionally, the amplification unit can also be configured by means of an attenuation device which attenuates the signal before or after amplification. The attenuation device makes it possible to adjust an amplification of an amplifier of a circuit arrangement without adjusting the amplifier itself. This has the advantage that the signal amplifier can be produced in a simple and cost-effective manner. The amplification of the circuit arrangement results in the case of the constant amplification of the amplifier minus the signal attenuation of a configurable attenuation device. This attenuation device can be adjustable continuously or discretely within a range of attenuation values.

Configuring the amplification unit preferably comprises configuring the one or more amplifiers based upon the comparison parameter. This makes it possible to adapt the one or more amplifiers to the maximum power difference of the signal to be amplified and thus to ensure operation in the linear range of the amplifier.

The determination of the measured values to be processed, such as the maximum value Nmax and the minimum value Nmin of the N measured values, the required calculations, such as the calculation of the difference between Nmax and Nmin, and the determination to be made based upon the determined modulation type or configuration of the amplifier unit, such as the comparison of the calculated difference with one or more threshold values, are preferably carried out by a control unit. The control unit preferably comprises an analog-to-digital converter (ADC) and a microcontroller or a complex programmable logic device (CPLD). It is also conceivable for the analog-to-digital converter to be integrated in the microcontroller.

Preferably, the configuration of the amplification unit is carried out in such a way that an output power of the amplified signal at the antenna does not exceed a maximum permissible output power of a signal transmission standard used. This ensures that the amplification unit acts in a standard-compliant manner.

Complying with a maximum permissible output power of a signal transmission standard used is preferably achieved by configuring the attenuation device.

Configuring the one or more amplifiers preferably comprises adjusting the operating point of at least one of the one or more amplifiers. The amplification of the output power of the signal can thus be easily adjusted.

After configuration of the amplification unit, subsequent transmission signals transmitted by the end device and/or received by the antenna are preferably amplified by means of the amplification unit. Accordingly, the amplification unit can amplify in both directions, i.e., both incoming and outgoing signals.

The signal is preferably transmitted from an end device to the circuit arrangement. Accordingly, the modulation type is preferably determined by means of a signal transmitted by an end device. It is also conceivable to supplement the aforementioned methods and circuits in such a way that the modulation type is alternatively or additionally determined by means of a signal received from an antenna, i.e., a network-side signal (received signal for the end device).

The power of the signal is preferably detected in the circuit arrangement using a power detector. The power detector comprises, for example, an RMS (root mean square) detector, a logarithmic detector, a linear detector, or an envelope demodulator. The power detector can be arranged in the circuit arrangement in the direction of a signal originating from the end device and upstream or downstream of the one or more amplifiers. Depending upon where the power detector is arranged, the dynamic range of the power detector unit must be dimensioned differently. For example, if the power detector is arranged upstream of the one or more amplifiers, the power detector must be dimensioned such that the maximum expected power of the signal originating from the end device is still within the dynamic range of the detector. In the case of an arrangement of the power detector downstream of the one or more amplifiers, however, not the maximum expected power of the signal originating from the end device, but the maximum expected power of the signal amplified by the amplifier, is of importance.

An arrangement of the power detector upstream of the one or more amplifiers in the circuit arrangement has the advantage that the modulation type can be determined before the signal is amplified by the amplification unit. Accordingly, the amplification unit can be configured prior to amplification, based upon the determined modulation type. However, this presupposes a higher sensitivity of the detection unit, since the signal to be analyzed has not yet been amplified.

An arrangement of the power detector downstream of the one or more amplifiers in the circuit arrangement has the advantage that an amplified signal can be evaluated, and the detection unit therefore can be less sensitive. However, any distortions which occur as a result of the amplification must be taken into account in this case. However, since the signal is amplified before the modulation type is determined, this arrangement has the disadvantage that amplification has to take place with standard values (default values) until the modulation type has been determined.

However, this arrangement additionally has the advantage that the output power after amplification can also be measured and checked by means of the detection unit. It is thus possible, for example, to check compliance with the maximum output power required by a communications standard.

The circuit arrangement is preferably designed to be able to simultaneously determine the modulation type and amplify transmission signals. This is achieved by dividing the signal into at least a first signal portion and a second signal portion, wherein the first signal portion is passed to the power detector, and the second signal portion is passed to the amplification unit.

The division into a first signal portion and a second signal portion can take place by decoupling a first signal portion by means of a coupling unit. The coupling unit may include one or more directional couplers or splitters. The signal is preferably filtered by means of a high-frequency filter before it is supplied to the power detector. This has the advantage that interfering elements can be filtered out before the power is evaluated by the power detector. These filters can also be used to allow only the transmission signal or the received signal to pass to the power detector. In the case of transmission signals and received signals that are transmitted in different frequency ranges, this can be done, for example, by means of one or more bandpass filters.

The method furthermore preferably comprises determining an average power of the signal—in particular, determining an effective power of the signal—and adjusting the one or more reference values or reference patterns based upon the determined average power of the signal. The adjustment of the one or more reference values or reference patterns enables a more accurate determination of the modulation type. The adjustment may be necessary, on the one hand, because, depending upon the embodiment, the power detector has a low-pass effect at the output. The low-pass effect averages the maximum and minimum values Nmax and Nmin with increasing low-pass effect and thus reduces the difference between Nmax and Nmin. On the other hand, the adjustment may be required if the power detector is arranged downstream of the one or more amplifiers, and the one or more amplifiers overdrive the signal to be amplified. This has the result that the difference between the values Nmax and Nmin is reduced.

The method furthermore preferably comprises determining a duration of the signal, configuring the amplification unit based upon the determined duration of the signal, and reducing the signal amplification generated by the one or more amplifiers if the signal is longer than a predetermined time span. If the signal is transmitted by means of a time-slot-based transmission type, the predetermined time span preferably corresponds to two or more consecutive transmission time slots. The reduction in the power in the case of longer-lasting signals enables the amplifiers to be protected from thermal overload. Such a power reduction also occurs in various mobile radio standards; see, for example, ETSI TS 151 010-1 v.12.5.0. The circuit arrangement is thus able to partially reproduce the behavior of different mobile radio standards and to thus adapt to them.

A method according to the invention for amplifying signals between an end device and an antenna by means of a circuit arrangement, wherein the circuit arrangement comprises an amplification unit having one or more amplifiers arranged in parallel signal branches, comprises receiving a signal at the circuit arrangement, determining a duration of the signal, and configuring the amplification unit based upon the determined duration of the signal. The method may further comprise reducing the signal amplification generated by the one or more amplifiers if the signal is longer than a predetermined time span. If the signal is transmitted with the aid of a time-slot-based transmission type, the predetermined time span preferably corresponds to two or more consecutive transmission time slots.

The method makes it possible to configure the amplification unit based upon the duration of a transmission signal. As already mentioned above, this can be advantageous in the case of long-lasting signals, since a thermal overload of amplifiers and, where applicable, other components can be avoided.

Preferably, the configuration of the amplification unit is carried out in such a way that an output power of the amplified signal at the antenna does not exceed a maximum permissible output power of a signal transmission standard used. This ensures that the circuit arrangement operates in a standard-compliant manner.

A circuit arrangement according to the invention has means designed to carry out one of the aforementioned methods.

For simplicity, the following description usually refers to the determination of a modulation type of the signal from a plurality of modulation types. This is not to be understood as meaning only that a modulation type is unambiguously defined, or is stored so as to readable. This also means that, based upon the recognized (modulation) properties of the signal, i.e., the detected power with respect to the one or more reference values or reference patterns, units of a circuit arrangement are configured, as already stated above, i.e., the operating points of the amplifiers of an amplification circuit are, for example, configured.

BRIEF DESCRIPTION OF THE DRAWINGS

Further examples and embodiments are described below with reference to the drawing, in which.

DETAILED DESCRIPTION OF THE PREFERRED EMBODIMENTS

Figure 1:
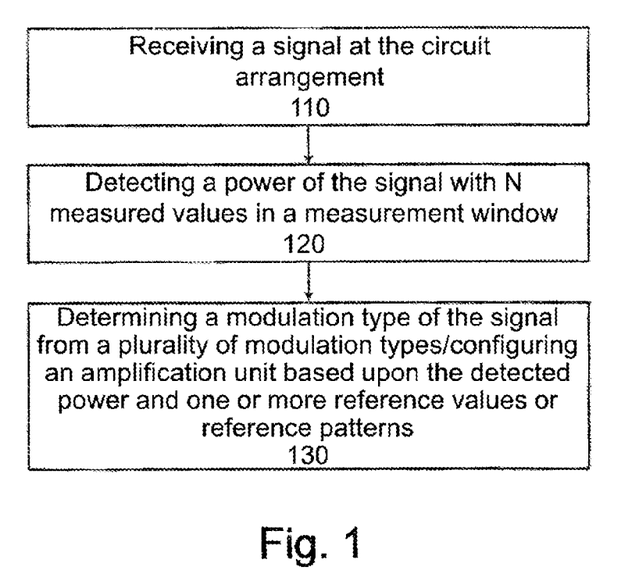
FIG. 1 shows a method for determining a modulation type of a signal or the configuration of an amplification unit using a circuit arrangement.

FIG. 1 shows a method for determining a modulation type of a signal signal or the configuration of an amplification unit by means of a circuit arrangement. Examples of a modulation type to be determined include GMSK, 8-PSK, or 16-QAM.

In step 110, the circuit arrangement receives a signal. This signal can be received at the circuit arrangement via either a cable or a radio interface. When the radio interface is used, the circuit arrangement can have a transmission unit which receives wireless radio transmission signals and couples them into a high-frequency line for further processing and/or decouples received signals for wireless transmission. Dispensing with a wired connection between a transmitting device that sends the signal and the circuit arrangement allows support of a plurality of end devices without a uniform cable interface, as well as greater spatial flexibility and additional comfort. If a cable is used, interferences which occur in the case of a radio connection can be avoided.

In step 120, a power of the signal is detected with N measured values in a measurement window. For detecting the N measured values, the signal is sampled consecutively N times. In order to be able to determine the modulation type reliably, it may be necessary for all N values to belong to the same signal. Accordingly, it is, for example, not possible to take into account previously detected measured values, which may belong to another signal, in determining the modulation type. Depending upon which communications standard is used, and thus which modulation types are to be distinguished from one another, the number of measured values can be adapted. For example, the number N of measured values can be more than 10 measured values— preferably, more than 20 measured values. The number N of measured values can also be less than 100 measured values—preferably, less than 50 measured values. In a preferred embodiment, the number N may correspond to 32 measured values.

The measured values are preferably distributed uniformly in the measurement window. Different modulation types, however, may require a different arrangement of the measured values in the measurement window. Thus, the arrangement may need to be adapted to the signal to be sampled.

In addition, it may be necessary to adapt the duration of the measurement window to the modulation type to be detected. The measurement window should preferably be longer than the duration of a modulated symbol of the signal, in order to be able to determine the modulation type reliably. As a rule, at least one complete symbol must be available for a reliable determination. However, the measurement window must also not be selected to be too large, since, otherwise, it could exceed the signal, i.e., be longer than the signal itself. Then, some of the N measured values could, in the absence of the transmission signal, be recorded, which could lead to false results. An exemplary duration of a measurement window may be more than 50 µs—preferably, more than 90 µs. Furthermore, the duration may, for example, be less than 200 µs—preferably, less than 110 µs. In a preferred embodiment, the measurement window may have a duration of 100 µs. In other embodiments, longer measurement windows are also conceivable, e.g., a measurement window which has a duration of more than 5 ms and is preferably less than 15 ms—for example, 10 ms.

If a time-slot-based transmission method, such as GSM or LTE-TDD, is used in the transmission of the signal, the measurement window should preferably be adapted to a duration of one transmission time slot. In particular, the measurement window is preferably shorter than or equal to a duration of one transmission time slot, in order to enable reliable determination of the modulation type. This reliable determination of the modulation type is generally only possible if the measurement window does not exceed one transmission time slot, since, in such a case, some of the N measured values could be detected in the absence of a signal, which can lead to incorrect results in the further determination.

The point in time of the start of the measurement window should also preferably be determined according to the modulation type and/or transmission type. For example, in a time-slot-based transmission type, an arrangement of the measurement window in the middle of the transmission time slot is advantageous. N measured values are preferably detected during the training sequence in the case of a signal according to the GSM/EDGE communications standard.

In step 130, the modulation type of the signal is determined from a plurality of modulation types based upon the detected power and one or more reference values or reference patterns, and/or the amplification unit is configured based upon the detected power and one or more reference values or reference patterns.

The modulation type of the signal can be determined, for example, by determining a maximum value Nmax and a minimum value Nmin of the N measured values. Prior sorting of the N measured values may be required for this determination. After the determination of the maximum value Nmax and of the minimum value Nmin, a difference between Nmax and Nmin can be calculated. The difference reflects the peak-to-peak power of the signal. The determination preferably comprises a comparison with a lower threshold value and with an upper threshold value. It can be determined whether the calculated difference lies within a threshold value range spanned by the lower threshold value and in the upper threshold value. Each modulation type may have its own predetermined lower threshold value and a predetermined upper threshold value.

In this case, the calculated difference can be compared successively with the threshold values of the different modulation types. The order in which the difference is compared with the threshold values of the different modulation types may vary depending upon the embodiment. For example, probabilities of using different modulation types may be known, and the order may be adapted to them. If the calculated difference falls within the threshold value range, spanned by the lower threshold value and the upper threshold value, of a specific modulation type, it can be determined that the signal is present in this modulation type. When comparing the calculated difference with the threshold value range, the respective threshold value limits can be included in or excluded from the threshold value range.

Instead of forming the difference, it is also possible to form a quotient of the maximum value Nmax and the minimum value Nmin and to make it the basis of the comparison.

In this respect, it is also possible, both in the embodiment in which the difference is formed and in the embodiment in which the quotient is formed, to use an average power value of the N measured values instead of the maximum value Nmax or the minimum value Nmin.

Instead of the determination based upon threshold value comparison, or in addition to such threshold value comparison, it is also possible to correlate the detected amplitude time curve with one or more reference patterns. In this case, the modulation type is determined on the basis of the results of the correlation.

In one embodiment, the circuit arrangement distinguishes between the GMSK and 8-PSK modulation types. In this case, the predetermined lower threshold value and the predetermined upper threshold value of 8-PSK are respectively greater than the predetermined lower threshold value and the predetermined upper threshold value of GMSK. For example, when using 8-PSK and GMSK for modulation in the GSM/EDGE mobile radio standard, the lower threshold value of GMSK may be 0 dB and the upper threshold value of GMSK may be 0.1 dB, wherein the lower threshold value of 8-PSK may be 2 dB, and the upper threshold value of 8-PSK may be 4 dB, for example.

In the case where only two different modulation types are to be distinguished, a single threshold value may suffice for the determination. The modulation type is accordingly determined by selecting the first modulation type if the calculated difference is above or, where applicable, below the threshold value, and otherwise selecting the second modulation type. For example, if 8-PSK and GMSK are used for a modulation in the GSM/EDGE mobile radio standard, such a threshold value may be between 0.5 and 1 dB.

This method according to the invention thus enables simple determination of a modulation type of a received signal on the basis of its power. This may be of considerable importance for efficient subsequent processing of the signal.

For example, modulation-type-specific parameters can thus be taken into account in the subsequent processing.

Such modulation-type-specific parameters can be helpful, in particular, in the subsequent processing of a signal in a circuit arrangement designed to amplify signals between an end device and an antenna.

Figure 2:
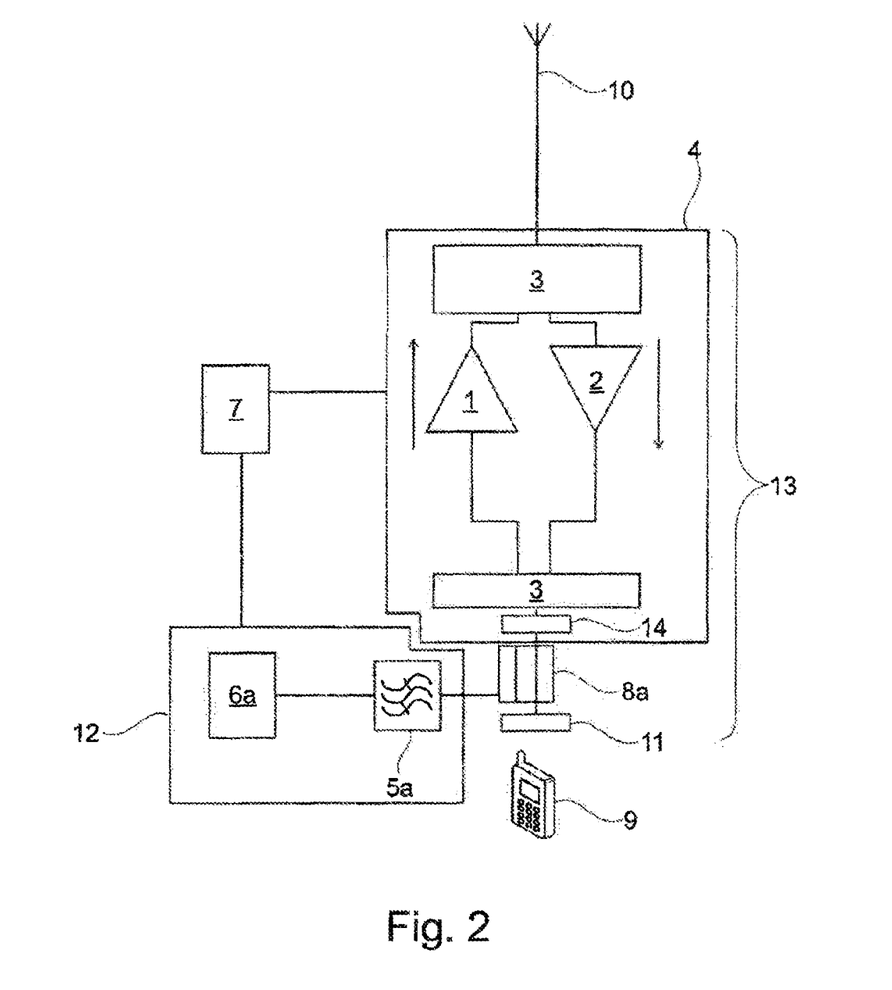
FIG. 2 shows a circuit arrangement, which allows an adjustment of an amplification unit based upon a determined modulation type, according to an embodiment of the invention.
Figure 3:
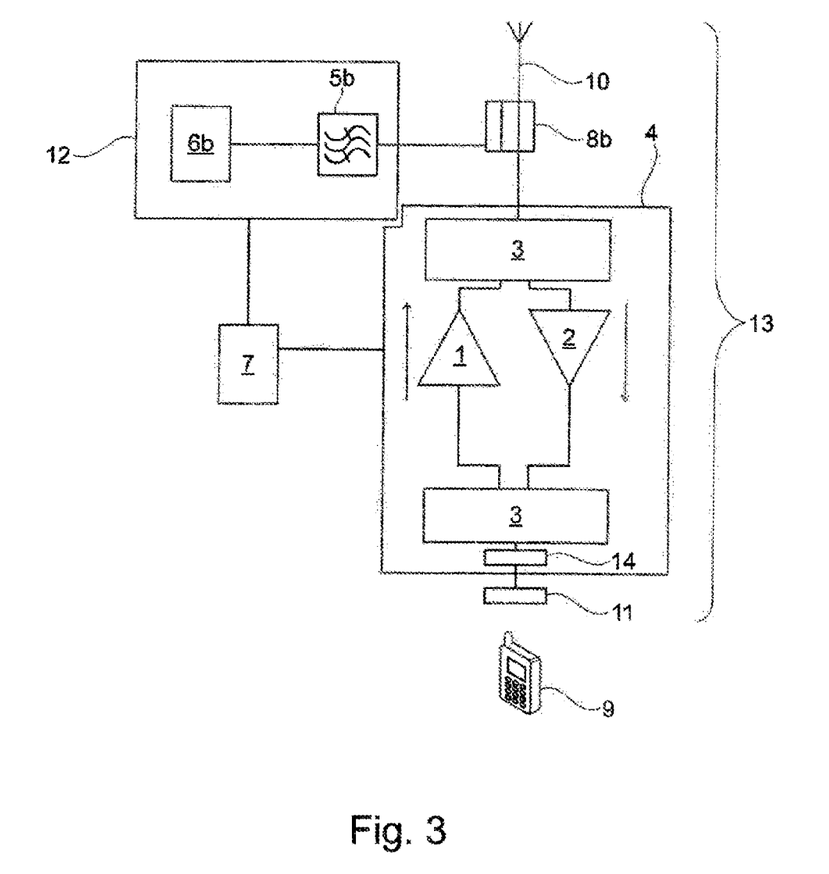
FIG. 3 shows a circuit arrangement, which allows an adjustment of an amplification unit based upon a determined modulation type, according to another embodiment of the invention.

FIGS. 2 and 3, which show two different embodiments enabling an adjustment of an amplification unit based upon a determined modulation type, are described below.

FIG. 2 shows a circuit arrangement according to an embodiment of the invention enabling adjustment of an amplification unit based upon a determined modulation type, wherein the amplification unit is configured to amplify signals between an end device and an antenna.

Such a circuit arrangement has the advantage that the respective maximum output power specific to a modulation type can be supported by the amplification unit. This is particularly helpful if the circuit arrangement supports communications standards which provide different modulation types, and these modulation types allow different maximum output powers. Namely, in this case, optimal amplification of signals of the different modulation types of this communications standard can be achieved. This also prevents possible overdriving of the amplifier output stages and ensures that the amplifier operates in the linear range.

The circuit arrangement 13 shown in FIG. 2 connects an end device 9 to an antenna 10. The end device 9 is preferably an electronic device capable of performing wireless communications, such as a mobile phone, a smartphone, a modem, or a radio module. The antenna 10 is, for example, an antenna externally mounted on a motor vehicle or an antenna connection. The end device 9 and the antenna 10 themselves are not part of the circuit arrangement.

The circuit arrangement 13 serves to amplify the signals transmitted by the end device 9—also called transmission signals—and/or the signals received by the antenna 10—also called received signals. The amplification of the circuit arrangement 13 can in this case be designed such that it compensates for the attenuation of the signal power between the antenna 10 and the end device 9.

The circuit arrangement 13 preferably comprises an amplification unit 4, a detector unit 12, a coupling unit 8a, a control unit 7, and a transmission unit 11. The individual modules and units can be part of the circuit arrangement itself or can be independent of the circuit arrangement 13. The detector unit 12 together with the control unit 7 serve to determine the modulation type of a signal. The control unit 7 is furthermore designed to configure and, where applicable, set the amplification unit 4 based upon the determined modulation type. The set amplification unit 4 then amplifies the signals.

After adjustment of the amplification unit, subsequent transmission signals transmitted by the end device and/or received by the antenna are preferably amplified by means of the amplification unit. Accordingly, the amplification unit can amplify in both directions, i.e., both incoming and outgoing signals. However, the modulation type determination is preferably performed on the basis of a signal transmitted by an end device to the circuit arrangement. Modulation type determination on the basis of a received signal is also possible and can be useful when using different modulation types.

Preferably by means of a transmission unit 11, the circuit arrangement 13 receives the signals transmitted by the end device for further line-based processing by means of the circuit arrangement and transmits received signals of the antenna 10 to the end device 9 after further processing by the circuit arrangement. The transmission unit 11 does not necessarily form part of the circuit arrangement.

The transmission unit 11 may be designed for both wireless and wired communication with the end device 9.

In this embodiment, a coupling unit 8a, which serves to divide a transmission signal of the end device into (at least) a first signal portion and a second signal portion and to supply the first signal portion to the detector unit 12 and the second signal portion to the amplification unit 4, follows the transmission unit 11 in the transmission signal direction. In this embodiment, the detection accordingly takes place before the signal has been amplified by the amplification unit.

The coupling unit 8a comprises, for example, a directional coupler or splitter. In the decoupling provided by the coupling unit 8a, the first signal portion of the transmission signal of the end device may preferably have a lower power than the second signal portion. Accordingly, only a small proportion of the power is used for the detection, and the second signal portion can be forwarded to the amplification unit 4 and/or the antenna 10 without any major power loss.

The first signal portion can then be filtered by means of a high-frequency filter (HF filter) 5a before it is supplied to a power detector. This has the advantage that interfering signal portions can be filtered out before the power is evaluated by the power detector. The filter 5a can also be used to allow only the transmission signal to pass to the power detector. In the case of transmitted useful signals and received useful signals which are transmitted in different frequency ranges, this can be done, for example, by one or more bandpass filters.

The power of the signal is then detected in the circuit arrangement using a power detector. The power detector comprises, for example, an RMS (root mean square) detector, a logarithmic detector, a linear detector, or an envelope demodulator. In this embodiment, the power detector must be dimensioned such that the maximum expected power of the signal originating from the end device can still be measured in the linear range of the detector.

The arrangement of the power detector upstream of the amplification unit, as shown in FIG. 2, has the advantage that the modulation type can be determined before the signal is amplified by the amplification unit. Accordingly, the amplification unit can already be configured prior to amplification based upon the determined modulation type. However, this presupposes a higher sensitivity of the detection unit, since the signal to be analyzed has not yet been amplified.

The power detector 6a then forwards the detected power values, e.g., in the form of a direct voltage, to the control unit 7. The control unit 7 comprises, for example, a microcontroller, an analog-to-digital converter (ADC), and/or a complex programmable logic device (CPLD).

The control unit 7 can then determine the maximum value Nmax and the minimum value Nmin of the N measured values and calculate the difference between Nmax and Nmin. The control unit can subsequently compare the calculated difference with one or more threshold values. For the comparison, as already described with reference to FIG. 1, the corresponding threshold values of different modulation types are compared with the difference. If the difference falls within a threshold value range of a modulation type, the control unit can determine that the signal is present in this modulation type. The modulation type can also be determined on the basis of only one threshold value, if only two modulation types are to be distinguished.

If the modulation type of the signal was determined from a plurality of modulation types based upon the comparison, the control unit can configure the amplification unit based upon the determined modulation type and/or the calculated difference. An amplification unit 4 according to the invention can, for example, have one or more amplifiers 1, 2. These can be arranged in parallel signal branches. In the embodiment shown in FIG. 2, only one reception amplifier 2 and one transmission amplifier 1 are shown in each case. However, the amplification unit may have a plurality of transmission amplifiers and reception amplifiers, depending upon how the amplification is implemented and depending upon which communications standards and frequency bands are to be supported. The amplification unit may also have a signal splitting unit 3 for dividing the signal into a transmission branch and a reception branch. The signal splitting unit 3 can have one or more frequency separators, one or more couplers, or one or more switches 3, which enable dividing the signal into a transmission branch and a reception branch. Such a signal splitting unit 3 can, for example, also be configured or controlled by the control unit.

The amplification unit can be configured in different ways. Preferably, configuring the amplification unit comprises configuring the one or more amplifiers and/or configuring the signal routing in the amplification unit and/or configuring an attenuation device.

In configuring the one or more amplifiers, settings of the one or more amplifiers themselves are adjusted. Preferably, the operating point of at least one or more amplifiers is adapted in this case. In particular, the one or more amplifiers can be adjusted based upon the calculated difference. This makes it possible to adapt the one or more amplifiers to the maximum power difference of the signal to be amplified and thus to ensure operation in the linear range of the amplifier.

The alternative or supplemental configuration of the signal routing enables configuring the amplification unit by activating and/or deactivating different signal branches, which may have differently designed amplifier devices. Thus, for example, a first signal branch may have an amplifier for a first maximum output power of a first modulation type, and a second signal branch may have an amplifier for a second maximum output power of a second modulation type. The amplification unit can then be configured in such a way that the first signal branch is switched in the case of a signal of a first modulation type, and the second signal branch is switched in the case of a signal of a second modulation type.

Alternatively or additionally, the amplification unit can also be configured by means of an attenuation device 14 which attenuates the signal before or after amplification. The attenuation device 14 can provide an adjustment of the amplification of the amplifiers 1, 2 without adapting the amplifiers 1, 2 themselves. This has the advantage that the signal amplifier can be produced in a simple and cost-effective manner. In this case, the amplification of the circuit arrangement 13 results from the constant amplification of the amplifier 1, 2 minus the signal attenuation of a configurable attenuation device 14. This attenuation device 14 can be continuously or discretely adjustable within a range of attenuation values. In this embodiment, the attenuation device 14 is arranged downstream of the coupling unit 8a in the direction of the signal transmitted by the end device. However, in other embodiments, the attenuation device may also be arranged at other locations of the circuit arrangement. For example, it may be arranged directly upstream of the amplifier 1 in one embodiment. Other embodiments are possible, depending upon the circuit design.

The configuration of the amplification unit is to be carried out in such a way that an output power of the amplified signal at the antenna does not exceed a maximum permissible output power of a signal transmission standard used. This ensures that the amplification unit acts in a standard-compliant manner. Complying with a maximum permissible output power of a signal transmission standard used is preferably achieved by configuring the attenuation device 14.

The circuit arrangement is furthermore preferably designed to be able to simultaneously determine the modulation type and amplify transmission signals. This is achieved by dividing the signal into at least a first signal portion and a second signal portion, wherein the first signal portion is passed to the detector unit, and the second signal portion is passed to the amplification unit. Accordingly, the transmission and the amplification by the amplification unit are not interrupted or disturbed by performing the modulation type determination.

Preferably, the circuit arrangement can furthermore be designed to determine an average power of the signal and to adjust the one or more threshold values based upon the determined average power of the signal.

The adjustment of the one or more threshold values enables a more accurate determination of the modulation type. The adjustment may be necessary, on the one hand, because the power detector has a low-pass effect at the output. The low-pass effect averages the maximum and minimum values Nmax and Nmin with increasing low-pass effect and thus reduces the difference between Nmax and Nmin. On the other hand, the adjustment may be required if the power detector is arranged downstream of the one or more amplifiers, and the one or more amplifiers overdrive the signal to be amplified. This has the result that the difference between the Nmax and Nmin values is reduced.

Preferably, the circuit arrangement can furthermore be designed to determine a duration of the signal and configure the amplification unit based upon the determined duration of the signal. Configuring the amplification unit can comprise reducing the signal amplification generated by the one or more amplifiers if the signal is longer than a predetermined time span. If the signal is transmitted by means of a time-slot-based transmission type, the predetermined time span preferably corresponds to two or more consecutive transmission time slots. The reduction in the power in the case of longer-lasting signals makes it possible to protect the amplifiers from thermal overload. Such a power reduction also occurs in various mobile radio standards; see, for example, ETSI TS 151 010-1 v.12.5.0. The circuit arrangement is thus able to partially reproduce the behavior of various mobile radio standards and to thus adapt to them.

FIG. 3 shows a circuit arrangement which enables adaptation of an amplification unit based upon a determined modulation type, according to another embodiment of the invention.

The circuit arrangement of FIG. 3 largely corresponds to the circuit arrangement of FIG. 2. The circuit arrangement of FIG. 3 differs only in the arrangement of the detector unit 12 and the consequences resulting therefrom. In FIG. 3, the detector unit 12 is arranged downstream of the amplification unit 4 in the direction of the transmission signal transmitted by the end device 9.

The arrangement of the power detector 6b downstream of the amplification unit 4 has the advantage that an amplified signal can be evaluated, and the detection unit 12 therefore may be designed to be less sensitive. However, any distortions which occur as a result of the amplification must be taken into account in this case. However, since the signal is amplified before the modulation type is determined, this arrangement has the disadvantage that amplification has to take place with standard values (default values) until the modulation type has been determined.

However, this arrangement additionally has the advantage that the output power after amplification can also be measured and checked by means of the detection unit 12. It is thus possible, for example, to use measurement technology to check compliance with the maximum output power required by a communications standard. In contrast, in the circuit arrangement shown in FIG. 2, a corresponding check of the maximum output powers required by the communications standards could be carried out by computationally determining the resulting output power based upon the known attenuation by the attenuation device 14 and the known amplification by the amplifier 1, and comparing it with the predetermined limit value(s).

The signal amplified by the amplification unit is accordingly divided by a coupling unit 8b into (at least) a first signal portion and a second signal portion. The first signal portion is then routed to the detector unit, and the second signal portion is routed to the antenna 10 for transmission.

The detector unit 12 comprises an HF filter 5b and a power detector 6b, which are adapted to the amplified signal. In this embodiment, the power detector must accordingly be dimensioned such that the maximum expected power of the signal amplified by the amplifier can still be measured in the linear range of the detector.

In another embodiment, the signal passed to the detector unit can also be decoupled directly upstream of the input or downstream of the output of the amplifier 1.

Figure 4:
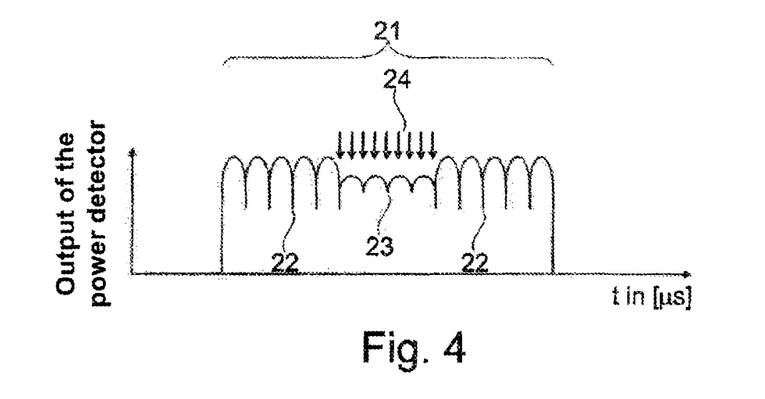
FIG. 4 shows a power of an 8-PSK-modulated signal as an output of a power detector.
Figure 5:
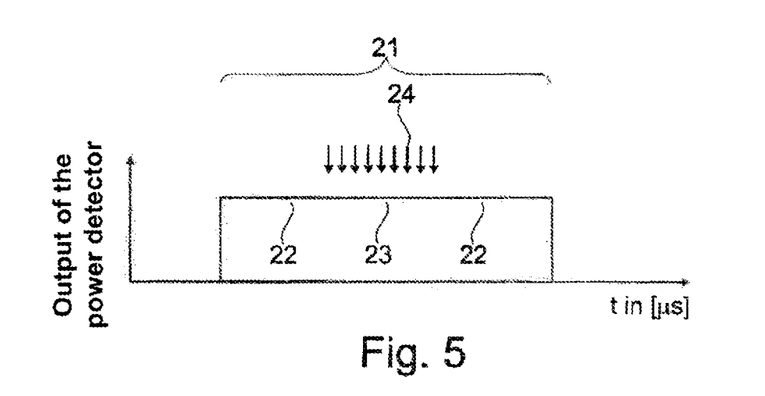
FIG. 5 shows a power of a GMSK-modulated signal as an output of a power detector.
Figure 7:
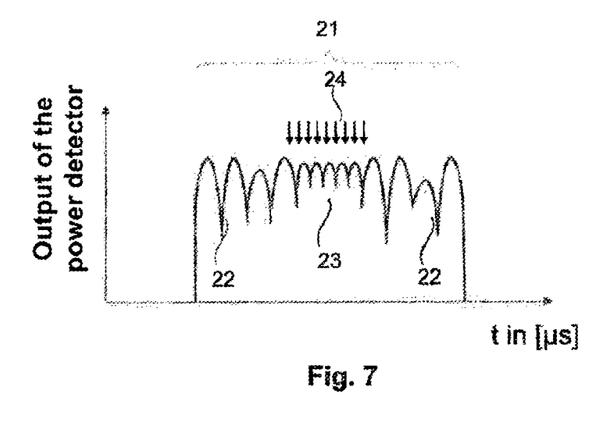
FIG. 7 shows a power of a QAM-modulated (QAM16 or QAM32) signal as an output of a power detector.

FIGS. 4, 5, and 7 show the change over time of a power detector output (amplitude) for various modulation types. The power at the power detector is, for example, an output voltage (in volts).

FIG. 4 shows a power of an 8-PSK-modulated signal as an output of a power detector.

The output of the power detector shown is a power of an 8-PSK-modulated signal in the GSM/EDGE mobile radio standard. FIG. 4 shows a transmission slot 21 in the case of the 8-PSK modulation type in the EDGE standard. In this case, the transmission time slot has a duration of 577 µs. As can be seen in the figure, the N measured values 24 are preferably detected in the middle of the transmission time slot 21. The N measured values are preferably detected during the deterministic training sequence 23. In a practical implementation, 32 measured values are preferably recorded over a period of 100 µs. The measurable difference between Nmax and Nmin is, for example, 2 dB to 4 dB.

FIG. 5 shows a power of a GMSK-modulated signal as an output of a power detector.

The output of the power detector shown is a power of a GMSK-modulated signal in the GSM/EDGE mobile radio standard. FIG. 4 shows a transmission slot 21 for the case of the GMSK modulation type. As can be seen in the figure, in this case, the N measured values 24 are also preferably detected in the middle of the transmission time slot 21, between the useful data 22. The N measured values are preferably detected during the deterministic training sequence 23. In a practical implementation, 32 measured values are recorded over a period of 100 µs. The measurable difference between Nmax and Nmin is, for example, 0 dB to 0.1 dB.

FIG. 7 shows a power of a QAM-modulated (16-QAM or 32-QAM) signal as an output of a power detector.

The output of the power detector shown is a power of a QAM-modulated signal in the LTE mobile radio standard. The output of the power detector of a 16-QAM signal differs only slightly from that of a 32-QAM signal. The modulation type determination is thus limited in the case of QAM signals to determining that the signal is a QAM signal, without distinguishing whether the signal is a 16-QAM-modulated or 32-QAM-modulated signal. In this example, the N measured values 24 are also preferably detected in the middle of the transmission time slot 21, between the useful data 22. The N measured values are preferably detected during the deterministic training sequence 23. In a practical implementation, 32 measured values are, for example, recorded over a period of 100 μs. The measurable difference between Nmax and Nmin is, for example, more than 4 dB.

The different measurable differences between Nmax and Nmin of the modulation methods shown make it clear how the threshold value adjustment in the circuit arrangement can take place. Accordingly, the threshold values of the different modulation types are to be selected such that the respectively determined difference falls within the corresponding range. If GMSK is merely to be distinguished from 8-PSK, only a single threshold value can also be used. If the calculated difference is above the threshold value, it is 8-PSK, and, if the calculated difference is below the threshold value, it is GMSK. An exemplary threshold value could be between 0.5 and 1 dB in the case mentioned above.

Figure 6:
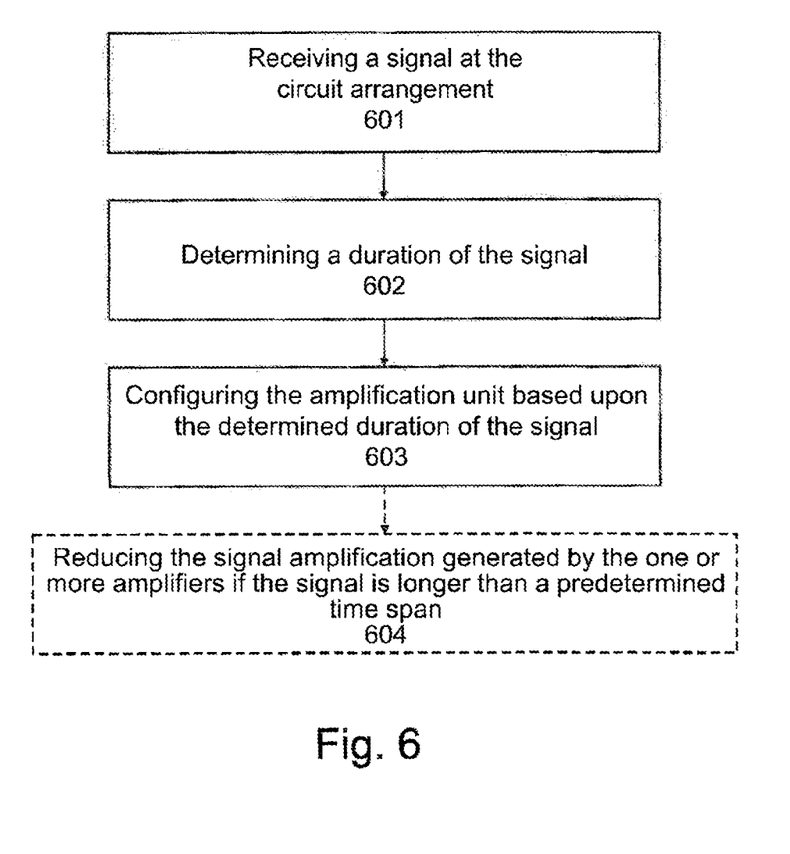
FIG. 6 shows further method steps of a method for amplifying signals between an end device and an antenna by means of a circuit arrangement according to an embodiment of the invention, wherein the amplification is adjusted based upon a duration of a signal.

FIG. 6 shows further method steps of the method for amplifying signals between an end device and an antenna by means of a circuit arrangement according to an embodiment of the invention, wherein the amplification is additionally adjusted based upon a duration of a signal.

This can be advantageous, in particular, in the case of long-lasting signals, since a thermal overload of the amplification unit—in particular, of individual amplifiers and, where applicable, of other components—can be avoided.

Such a method for amplifying signals between an end device and an antenna can be carried out by means of a circuit arrangement which preferably comprises one or more amplifiers arranged in parallel signal branches. For example, a circuit arrangement can be used for this purpose which is also used for determining the modulation type, wherein additional means are provided which are designed to analyze the duration of a signal. The means can be provided, for example, by adapting the detector unit and the control unit.

The additional method steps begin at step 601, with a signal being received at the circuit arrangement. The signal can be received at the circuit arrangement via either a cable or a radio interface. In the preferred embodiment, this step corresponds to step 110 in the method according to FIG. 1.

In step 602, the duration of the signal is determined. For example, a detector unit and a control unit as shown in FIGS. 2 and 3 may be used for this purpose. The detector unit and the subsequent control unit must be able to determine the duration of the signal.

In step 603, the amplification unit is then configured based upon the determined duration of the signal. In particular, the amplification of the amplification unit can be adapted to the duration of the signal. For example, in step 604, the signal amplification generated by the one or more amplifiers can be reduced if the signal is longer than a predetermined time span. Such a predetermined time span can, for example, be more than 1,000 μs—preferably, more than 2,000 μs—and/or less than 10,000 μs—preferably, less than 5,000 μs. If the signal is transmitted using a time-slot-based transmission type, the predetermined time span can correspond to two or more consecutive transmission time slots.

The invention claimed is:

1. Method for amplifying a signal between an end device and an antenna by means of a circuit arrangement, wherein the circuit arrangement comprises an amplification unit having one or more amplifiers arranged in parallel signal branches, comprising:
   receiving a signal at the circuit arrangement;
   detecting a power of the signal with N measured values in a measurement window, wherein the power of the signal in the circuit arrangement is detected by means of a power detector;
   determining a modulation type of the signal from a plurality of modulation types based upon the detected power and one or more reference values or reference patterns;
   configuring the amplification unit based upon the determined modulation type; and
   amplifying the signal between an end device and an antenna with the amplification unit.

2. Method according to claim 1, wherein detecting the power of the signal with N measured values in a measurement window comprises sampling the signal in the measurement window.

3. Method according to claim 1, wherein the measurement window is longer than the duration of a modulated symbol of the signal.

4. Method according to claim 1, wherein determining the modulation type comprises comparing an amplitude time curve of the detected power with a reference pattern.

5. Method according to claim 1, wherein determining the modulation type comprises:
   determining a first power value and a second power value, wherein the first and the second power value each is a different one from a maximum power value $N_{max}$, a minimum power value $N_{min}$, and an average power value of the N measured values;
   calculating a comparison parameter from the first and the second power value; and
   comparing the comparison parameter with one or more threshold values.

6. Method according to claim 5, wherein the comparison parameter of the first and the second power value comprises a difference or quotient of the first and the second power value.

7. Method according to claim 5, wherein the average power value of the N measured values is the effective power of the signal.

8. Method according to claim 5, wherein the comparison with the one or more threshold values comprises a comparison with a lower threshold value and with an upper threshold value and wherein each of the plurality of modulation types has a predetermined lower threshold value and a predetermined upper threshold value, and the modulation type of the signal is determined by the comparison parameter being greater than or equal to the predetermined lower threshold value and less than or equal to the predetermined upper threshold value of the modulation type.

9. Method according to claim 8, wherein the plurality of modulation types includes GMSK and 8-PSK, and the predetermined lower threshold value and the predetermined upper threshold value of 8-PSK are respectively greater than the predetermined lower threshold value and the predetermined upper threshold value of GMSK.

10. Method according to claim 5, wherein, if the plurality of modulation types includes at most two modulation types, comparing with the one or more threshold values includes comparing the comparison parameter with a single threshold value.

11. Method according to claim 10, wherein the modulation type of the signal is determined by the comparison parameter being above or below the threshold value or being equal to the threshold value and wherein the plurality of modulation types includes GMSK and 8-PSK, and the modulation type of the signal is 8-PSK if the comparison parameter is above the threshold value.

12. Method according to claim 1, wherein the plurality of modulation types includes at least one of the following modulation types: GMSK, 8-PSK, 16-QAM, or 32-QAM.

13. Method according to claim 1, wherein the method furthermore comprises:
   determining the frequency range and/or the time curve of the signal;
   limiting the plurality of modulation types based upon the determined frequency range and/or time curve of the signal.

14. Method according to claim 1, wherein, if the signal is transmitted by means of a time-slot-based transmission type, the measurement window is shorter than or equal to a duration of one transmission time slot.

15. Method according to claim 1, wherein configuring the amplification unit is carried out in such a way that an output power of the amplified signal at the antenna does not exceed a maximum permissible output power of a signal transmission standard used.

16. Method according to claim 1, wherein, before the signal is supplied to the power detector, it is filtered by means of a high-frequency filter.

17. Method according to claim 1, wherein the method furthermore comprises:
   determining an average power of the signal;
   adjusting the one or more reference values or reference patterns based upon the determined average power of the signal.

18. Method according to claim 17, wherein determining an average power of the signal comprises determining an effective power of the signal.

19. Method according to claim 1, wherein the method furthermore comprises:
   determining a duration of the signal;
   configuring the amplification unit based upon the determined duration of the signal;
   reducing the signal amplification generated by the one or more amplifiers if the signal is longer than a predetermined time span.

20. Method according to claim 19, wherein, if the signal is transmitted using a time-slot-based transmission type, the predetermined time span corresponds to two or more consecutive transmission time slots.

* * * * *